June 30, 1964     S. E. KOPLAR     3,139,022
THERMOSTATICALLY CONTROLLED MOTOR OPERATED WINDOW VENT
Filed June 21, 1961     3 Sheets-Sheet 1

INVENTOR.
SOLOMON EDWARD KOPLAR
BY Sheedy & Sheedy
HIS ATTORNEYS.

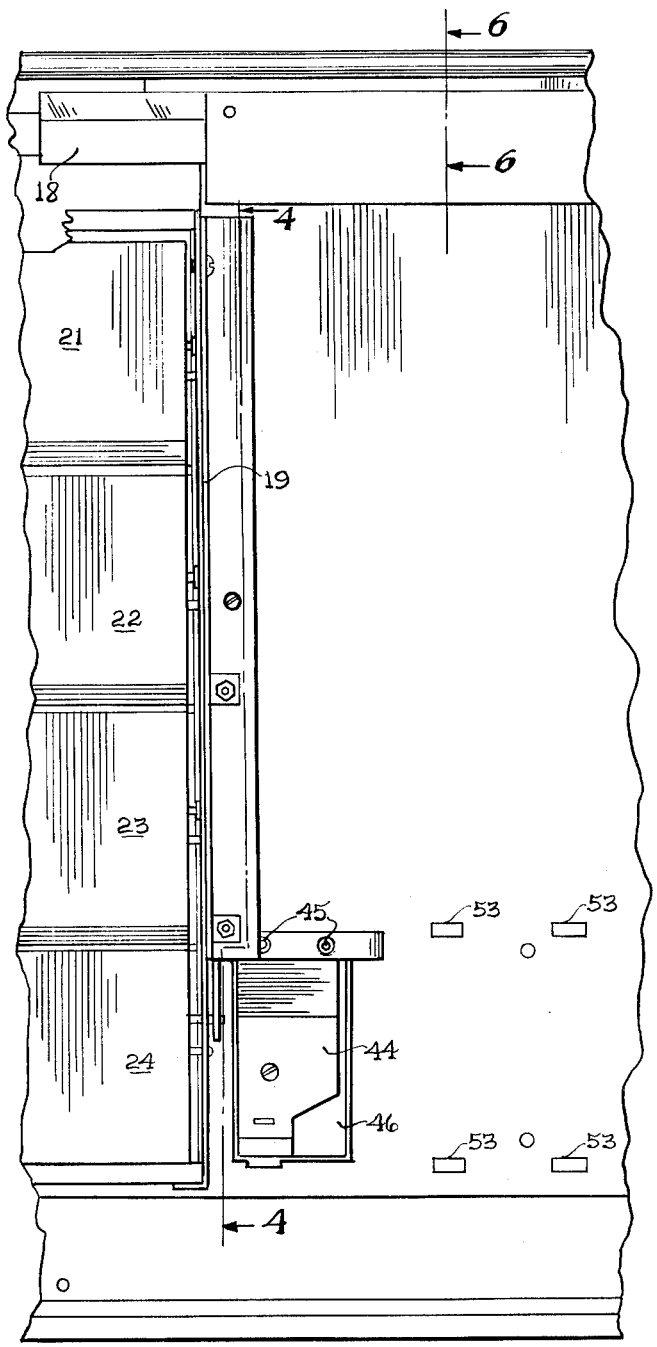

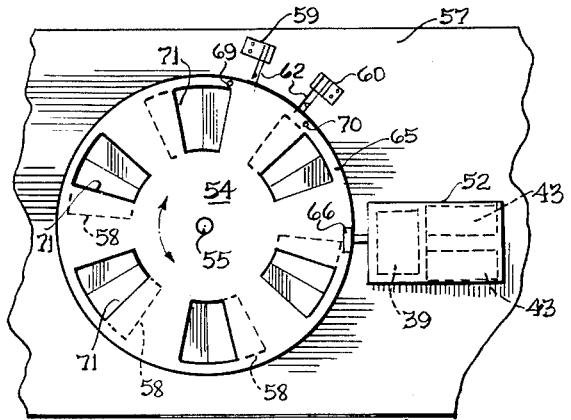
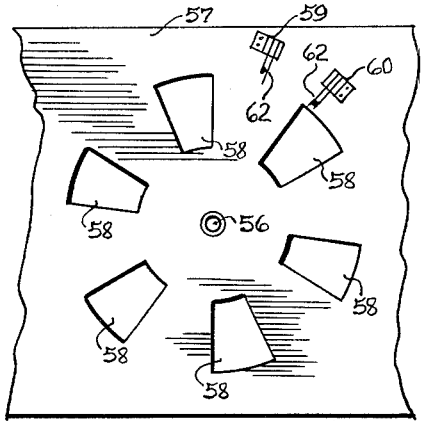
Fig. 7.    Fig. 8.
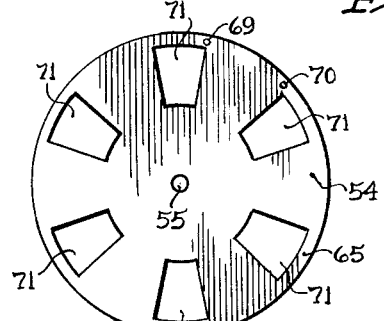
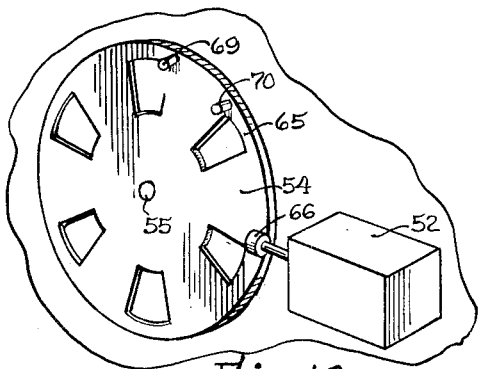
Fig. 9.    Fig. 10.
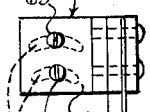
Fig. 11
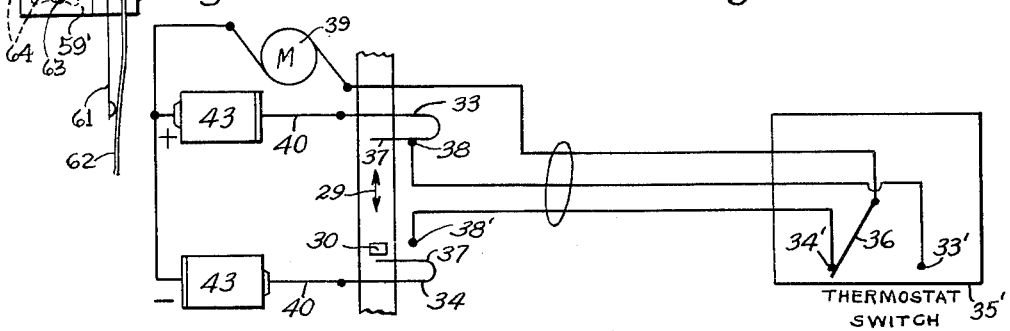
Fig. 12.
INVENTOR.
SOLOMON EDWARD KOPLAR
BY
HIS ATTORNEYS.

United States Patent Office
3,139,022
Patented June 30, 1964

1

3,139,022
THERMOSTATICALLY CONTROLLED MOTOR
OPERATED WINDOW VENT
Solomon Edward Koplar, Chicago, Ill., assignor to Electro-Transit Corporation, Chicago, Ill., a corporation of Illinois
Filed June 21, 1961, Ser. No. 125,898
4 Claims. (Cl. 98—99.8)

This invention relates to a new and useful improvement in a thermostatically controlled motor operated window vent and more particularly to a louvered type window vent that is automatically thermostatically controlled.

A principal object of my invention is to provide in an apparatus of this character a battery operated means thermostatically controlled for opening and closing a louvered type window vent.

Another object of my invention is to provide in an apparatus of this character a means whereby the window vent may be telescopically arranged to fit in window casings of various sizes.

Yet another object of my invention is in the provision in an apparatus of this character of a limiting switch arrangement for controlling the period of operation of the battery powered operating means.

A further object of my invention is in the provision in an apparatus of this character of a battery powered electric motor having operable connections to a series of louvered vents for simultaneously opening and closing the same.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 3 is a fragmentary rear elevational view of a portion of my improved window vent;

FIG. 4 is a side elevational sectional detail view taken on line 4—4 of FIG. 3;

FIG. 7 is a fragmentary front elevational view of a modified form of a thermostatically controlled motor operated window vent;

FIG. 8 is a fragmentary front elevational view of a portion of the modified window vent;

FIG. 9 is a front elevational view of the movable vent vane disc;

FIG. 10 is a perspective view of the movable vent vane disc;

FIG. 11 is a plan view of one of the limit switches as used in this invention; and FIG. 12 is a schematic wiring diagram.

Figure 1:
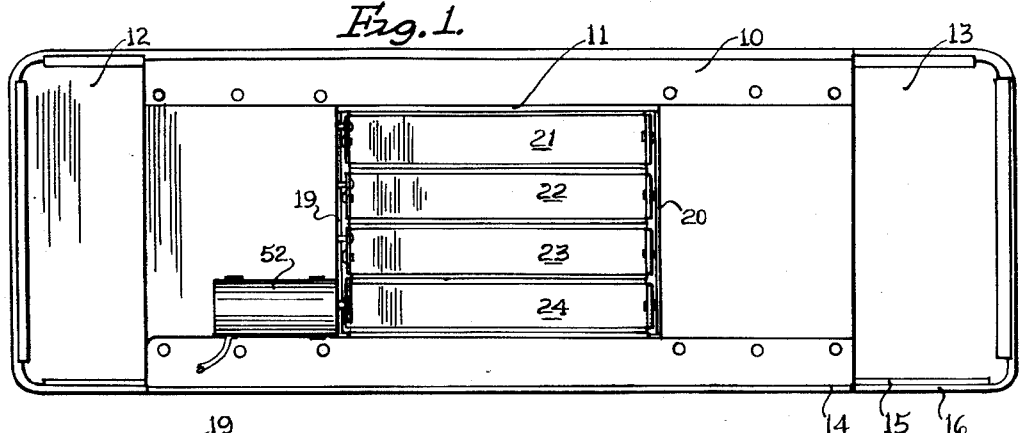
FIG. 1 is a front elevational view of my improved thermostatically controlled window vent.

My improved thermostatically controlled automatically operated window vent comprises a main body plate 10 having formed therein a central opening 11. Telescopically arranged on either end of the plate 10 are extension members 12 and 13. The plate 10 as well as the end extension members 12 and 13 are provided with peripheral channels 14 and 15 (FIG. 6) which frictionally accommodates a weather stripping 16. The plate 10 is provided with a plurality of rail members in the form

Figures 5, 6:
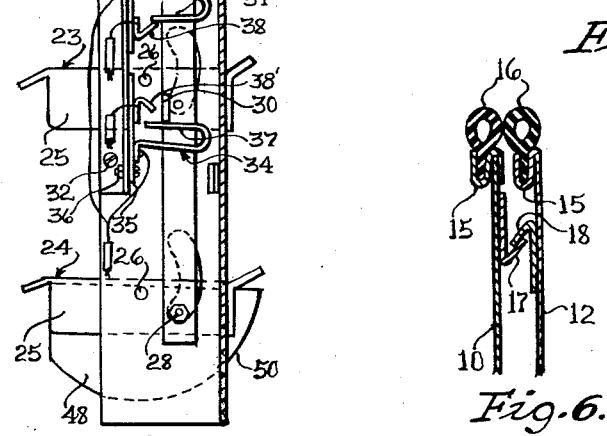
FIG. 5 is a side elevational sectional detail view similar to FIG. 3 but showing parts thereof in an operative position.
FIG. 6 is a sectional detail view taken on line 6—6 of FIG. 3.

2 of inverted hook elements 17 which slidably receive in retaining relation oppositely disposed rail members in the form of hook elements 18 of each of the end members 12 and 13, as seen in FIG. 6. By this arrangement each of the end members 12 and 13 are telescopically connected to the main body plate 10.

Figure 2:
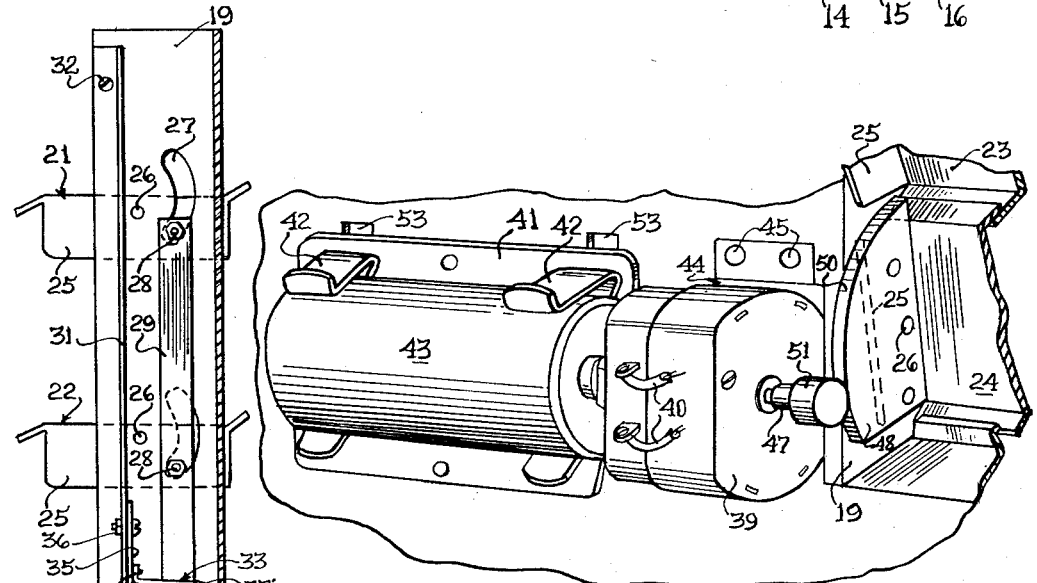
FIG. 2 is a fragmentary perspective view of the battery powered electric motor for operating the louvers of my improved window vent.

The opening 11 is defined by side flanges 19 and 20 which are perpendicularly disposed with respect to the longitudinal length of the body plate 10. In the central opening 11 and pivotally positioned between the side flanges 19 and 20 are louvered type vanes 21, 22, 23 and 24. Each vane terminates at opposite ends into side panels 25. These side panels 25 are adapted to be disposed in confronting parallel relation with respect to the side flanges 19 and 20 as seen in FIGS. 1, 2, and 3. Each side panel 25 of each of the vanes is in turn pivotally connected to its respective confronting side flanges 19 and 20 by a pivot pin 26.

Referring to FIGS. 4 and 5 it is seen that the side flange 19 is provided with a series of aligned arcuated slots 27. Each slot 27 prescribes an arc about a corresponding pivot pin 26 as seen in FIGS. 4 and 5.

A guide pin 28 is carried by each side panel 25 of each vane and is movably projected through its corresponding arcuated slot 27. Each of the guide pins 28 are in turn fixedly connected at their free end to a link 29, shown in the form of a bar extending in parallel confronting relation to the outer side surface of the side flange 19. From the foregoing description it is readily apparent that each vane 21, 22, 23 and 24 though separately pivotable about its pin 26 is connected together for simultaneous pivotal movement through the link 29.

The link 29 is provided with a switch actuator 30 which extends laterally therefrom and is disposed in a spaced parallel relation with respect to a switch support member 31. The switch support member 31 is connected to the outer side surface of the side flange 19 by means of screws 32 or the like. This switch support member 31 carries two spaced apart switch members 33 and 34.

Each of the switch members 33 and 34 are similar in construction and therefore I will describe but one and will apply the same reference numeral to each of the switch members.

The switch member 33 as well as the switch member 34 is mounted upon an insulated base 35 which is in turn connected to the switch support member 31 by a screw 36 or the like. The switch member 33 includes a substantially U-shaped yieldable switch finger 37 which has its free end disposed in the path of the switch actuator 30. The switch members 33 and 34 provide fixed contact members 38 and 38' respectively, mounted in spaced relation to the yieldable switch finger 37 and out of the path of the movement of the switch actuator 30. The switch members 33 and 34 are in turn operatively connected by wires 40 to a battery powered electric motor 39 and a thermostat control switch 35', as illustrated in the circuit diagram in FIG. 12. The thermostat control may be of any type presently on the market such as those associated with heating plants. The function and operation of such thermostat control is well known in the art and makes up no part of the present invention outside of its incorporation in the operative arrangement.

The main plate 10 has mounted thereto adjacent the side flange 19 a mounting plate 41 which carries frictional clamps 42 for receiving and securing a battery 43 thereto. This battery 43 is in turn connected to the electric motor 39. This motor 39 is carried by a mounting plate 44 which has one end fixed to the plate 10 by the means of rivets 45 or the like. The mounting plate 44 is adapted to extend through an opening 46 formed in the plate 10 so that the driven shaft 47 of the motor 39 carried thereby is disposed in close proximity to the vane 24 as seen in FIG. 2.

The side panel 25 of the vane 24 which is disposed in confronting parallel relation with the side flange 19 is provided with a driven member 48. This member 48 provides an arcuated edge 50 which has a portion thereof in contact with a roller 51 mounted on the driven shaft 47 of the electric motor 39.

It should be noted that the electric motor 39 is of a reversible type so that upon energization under certain conditions will cause the roller 51 to rotate in one direction and to reverse its direction of rotation upon energization of the motor 39 in a different manner.

The motor 39 as well as the battery 43 is adapted to be enclosed in a cover 52 which is provided with clip type legs that are adapted to extend in openings 53 formed in the plate 10.

In the operation of my invention the thermostat switch 35' associated therewith may be set in its normal manner to indicate a desired room temperature. Such thermostat switch 35' will then afford a temperature range of a number of degrees in either direction, above or below the set temperature at which point thermostat switch contacts 33' and 34' therein will be opened and/or closed. This is the normal function and operation of any well known type of thermostat on the market today.

Referring to FIG. 12, I show in the circuit illustration the thermostat 35' which includes two thermostat switch contacts 33' and 34' and has associated therewith a movable thermal responsive bi-metal switch arm 36', which arm 36' by a suitable conductor is connected to one side of the reversible motor 39. The switch contact 33' is connected to one side of the limiting switch 33 while the other thermostat switch contact 34' is connected at one side of the limiting switch 34. The circuit diagram of FIG. 12 represents the condition of the device as it is shown in FIG. 5 wherein the window vent is opened. As the temperature of the room decreases the bi-metal arm 36' of the thermostat 35' will be caused to move into engagement with the thermostat switch contact 33'. As the limiting switch 33 is closed, this movement of the bi-metal arm 36' will energize the motor 39 causing the shaft 47 and roller 51 carried thereby to be rotated in a direction so as to effect the closing of the vanes. The movement of the vanes will in turn move the link 29 from the position shown in FIG. 5 to that shown in FIG. 4 and such movement of the link 29 will in turn cause the switch actuator 30 to move away from the switch finger 37 of the limiting switch 34, permitting the same to close, and into engagement with the switch finger 37 of the upper limiting switch 33 causing the same to open so as to disrupt the circuit to the motor 39.

The reversal of this cycle will produce the exact opposite result. This reversal will take place when the bi-metal arm 36' responds to an increase in temperature and moves into engagement with the thermostat switch contact 34'. As the limiting switch 34 has been closed by the movement of the switch actuator 30, the motor 39 is reversely energized.

Thus it is seen that I have provided a thermostatically controlled battery operated means for controlling the operation of a window vent.

Referring to FIG. 7 I show a modified form of a thermostatically controlled motor operated window vent wherein the movable vanes are rotatably carried on a disc 54. This disc 54 is fixedly journalled on a shaft 55 which is rotatably journalled in a suitable bearing 56 carried by the body plate 57.

As viewed in FIG. 8 it will be seen that the body plate 57 is provided with a plurality of openings 58 formed radially about the shaft bearing 56. Carried by the body plate 57 are two spaced apart limiting switches 59 and 60. The switch 59 comprises a mounting bracket 59' which provides a support for a stationary switch contact 61 and a movable switch finger 62. The bracket 59' is adjustably connected to the body plate 57 by means of nuts and bolts 63 or the like. These nuts and bolts 63 are adapted to extend into arcuated slots 64 formed in the body plate 57. It is thus seen that through this connection the switch 59 may be adjusted relative to the fixed switch 60.

The disc 54 provides a peripheral edge portion 65 which is adapted to be engaged by a roller 66 operatively connected to the shaft 67 of a motor 68.

The movable vent vane disc 54 is provided with two spaced apart laterally extending pins 69 and 70. These pins are disposed in relation to the movable switch fingers 62 of the switches 59 and 60. As the disc 54 is rotated by the roller 66, say for example, in a clockwise direction the motor 68 will remain energized until the pin 69 engages the movable switch finger 62 of switch 59 and breaks contact thereof with the stationary switch 61. The reverse operation regarding pin 70 and switch 60 is the same when the disc 64 is caused to be rotated in an anticlockwise direction.

The disc 54 is provided with openings 71 which under certain conditions will be caused to be rotated in open communication with the openings 58 of the body plate 57. In this condition the vent is open. When the disc 54 is caused to rotate so that its openings 71 are disposed out of communication with the openings 58 of the body plate 57 the vent is closed. By adjusting the position of the switch 59, the registration of the openings 71 and 58 may be controlled.

In FIG. 12 I disclose a schematic circuit wired in accordance with the disclosure of the preferred form of the invention as contained in FIGS. 1 through 6. The same circuit may be adapted for the modified form shown in FIGS. 7 through 11.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A thermostatically controlled window vent comprising
   (a) a substantially rectangular shaped body having formed therein an opening,
   (b) a movable vane mounted in said opening,
   (c) means for rotatably mounting said vane in said opening,
   (d) a battery powered electrical reversible motor,
   (e) an arcuated flange mounted on one end of said vane,
   (f) a friction roller mounted on the shaft of said motor and rotatably engaging said arcuated flange of said vane for rotating the same in either direction into an open or closed position with respect to said opening,
   (g) a remote thermostatically controlled switch for initially energizing said motor,
   (h) means in circuit with said control switch and said motor for controlling the period of energization of said motor and the direction of rotation of said friction roller rotatably carried thereby, and
   (i) means connected to said vane and movable therewith for actuating said last named means for disrupting the circuit to said motor after said vane has been moved into either position by said friction roller rotatably carried by said motor.

2. A thermostatically controlled window vent comprising
   (a) a substantially rectangularly shaped body having an opening formed therein, (b) a vane mounted in said opening,
(c) means for rotatably mounting said vane in said opening,
(d) a battery powered electrical reversible motor,
(e) an arcuated flange mounted on one end of said vane,
(f) a roller carried at one end of a rotatable shaft of said motor engaging said arcuated flange carried by said vane for rotating the same in either direction into an open or closed position with respect to said opening,
(g) a remote thermostatically controlled switch for initially energizing said motor,
(h) a pair of spaced apart limiting switches mounted on said body in circuit with said control switch and said motor for controlling the period of energization of said motor and the direction of rotation of said roller carried thereby, and
(i) a switch actuator means connected to said vane and movable therewith for actuating said limiting switches as said actuator is moved therebetween by the movement of said vane into either its open or closed position for disrupting the circuit to said motor and to condition the circuit for re-energization by said thermostatically controlled switch.

3. A thermostatically controlled window vent comprising
(a) a substantially rectangular shaped body having telescopically arranged end extension members,
(b) said body having formed therein an opening,
(c) a vane movably mounted in the opening formed in said body,
(d) means for rotatably mounting said vane in said opening,
(e) a battery powered electrical reversible motor,
(f) said vane provided at one end with a laterally extending member providing an arcuated edge portion,
(g) a friction roller mounted on the shaft of said motor and rotatably engaging said arcuated edge portion of said vane for rotating the same in either direction into an open or closed position with respect to said opening,
(h) a remote thermostatically controlled switch for initially energizing said motor,
(i) means carried by said body and connected in circuit with said controlled switch and said motor for controlling the period of energization of said motor and the direction of rotation of said friction roller,
(j) and means connected to said vane and movable therewith for actuating said last named means for disrupting the circuit to said motor after said vane has been moved into either an open or closed position by rotation of said friction roller as it is rotated in either direction by said motor.

4. A thermostatically controlled window vent comprising
(a) a substantially rectangularly shaped body having telescopically arranged end extension members,
(b) said body having formed therein an opening,
(c) a vane movably mounted in said opening,
(d) means for rotatably mounting said vane in said opening,
(e) a battery powered electrical reversible motor adapted to be periodically energized so as to effect movement of said vane into an open or closed position with respect to the opening,
(f) said vane provided at one end with a laterally extending arcuated flange,
(g) a roller carried at one end of a rotating shaft of said motor and having rotatable engagement with said arcuated flange for rotating the same in either direction,
(h) a remote thermostatically controlled switch for initally energizing said motor,
(i) a pair of limiting switches carried by said body and in circuit with said control switch and said motor for controlling the period of energization of said motor and the direction of rotation of said friction roller carried thereby, and
(j) a switch actuator means connected to said vane and movable therewith for actuating said limiting switches for disrupting the circuit to said motor after said vane has been moved into either an open or closed position by said roller carried by said motor.

References Cited in the file of this patent
UNITED STATES PATENTS

| | | |
|---|---|---|
| 369,801 | Markland | Sept. 13, 1887 |
| 1,488,345 | Jenkins | Mar. 25, 1924 |
| 2,159,696 | Gross | May 23, 1939 |
| 2,614,479 | Johnson | Oct. 21, 1952 |
| 2,800,851 | Kronrad | July 31, 1957 |